United States Patent [19]

Yamanaka

[11] 4,175,634

[45] Nov. 27, 1979

[54] TRUCK WITH HYDRAULIC MEANS FOR ABSORBING IMPACT ENERGY

[75] Inventor: Akira Yamanaka, Yokohama, Japan

[73] Assignee: Mitsubishi Jidosha Kogyo Kabushiki Kaisha, Japan

[21] Appl. No.: 879,453

[22] Filed: Feb. 21, 1978

Related U.S. Application Data

[60] Continuation of Ser. No. 678,136, Apr. 19, 1976, Division of Ser. No. 506,796, Sep. 17, 1974, Pat. No. 3,993,352.

[51] Int. Cl.² .............................................. B62D 27/06
[52] U.S. Cl. .................................... 180/274; 188/299; 293/5; 296/189; 296/35 A
[58] Field of Search ................. 180/91, 94, 82 R, 89.1, 180/103 A, 100; 293/5; 296/35 R, 35 A, 28 M, 65 A, 1 R; 188/299

[56] References Cited

U.S. PATENT DOCUMENTS

| | | | |
|---|---|---|---|
| 2,959,446 | 11/1960 | Thompson | 296/65 A |
| 2,978,273 | 4/1961 | Racine | 296/65 A |
| 2,993,732 | 7/1961 | Walker | 296/65 A |
| 3,062,330 | 11/1962 | Lyon | 188/299 |
| 3,671,068 | 6/1972 | Gerhard | 180/82 R |
| 3,831,998 | 8/1974 | Hewitt | 180/91 |
| 3,851,722 | 12/1974 | Grosseau | 180/82 R |
| 3,861,736 | 1/1975 | Rossler | 296/28 M |
| 3,981,530 | 9/1976 | Yamanaka et al. | 180/103 A |

FOREIGN PATENT DOCUMENTS 1122195 9/1956 France .................................. 296/65 A

*Primary Examiner*—John P. Silverstrim
*Attorney, Agent, or Firm*—Robert E. Burns; Emmanuel J. Lobato; Bruce L. Adams

[57] ABSTRACT

A truck comprises a frame with a driver's cab fixed on the frame and a load carrier which is normally fixed on the frame but is frictionally slidable longitudinally of the frame in the event of a longitudinal impact exceeding a predetermined value. A first hydraulic unit connected between the frame and the load carrier comprises a cylinder and piston of which one is fixed to the frame and the other to the load carrier. A front bumper is mounted on the front of the frame with a second hydraulic unit and a rear bumper is mounted on the rear of the frame with a third hydraulic unit. The second and third hydraulic units are connected with the first hydraulic unit so that fluid pressure is transmitted to the first hydraulic unit in the event of impact with either bumper.

7 Claims, 3 Drawing Figures

TRUCK WITH HYDRAULIC MEANS FOR ABSORBING IMPACT ENERGY

This is a continuation, of application Ser. No. 678,136, filed Apr. 19, 1976 as a Division of Ser. No. 506,796, filed Sept. 17, 1974, now U.S. Pat. No. 3,993,352.

BACKGROUND OF THE INVENTION

The present invention relates to a truck that is designed to absorb impact force imposed on its driver at the time of collision.

Conventional energy absorbing devices of trucks, such as bumpers, for protecting the driver from collision have been unable to substantially absorb the energy engendered by collision unless they were made considerably larger in size than those for passenger cars etc. because of the greatness of their total deadweight. Also, different from passenger cars etc., kinetic energy added by the carrier and freights loaded thereon has been too great for the collision energy absorbing ability inherently exhibited by the chassis or body frame through their plastic deformation. As a consequence, negative acceleration G, which works on the driver when the truck collides, has increased to such an extent that might endanger the safety of the driver.

SUMMARY OF THE INVENTION

This invention provides a method for successfully eliminating the aforesaid shortcomings. A truck according to this invention has a carrier that is placed on its body frame so as to be longitudinally movable thereon when longitudinal impact force exceeding a given value works on its body, and energy absorbing means, interposed between said frame and carrier, for absorbing kinetic energy of said carrier by the use of hydraulic pressure produced by the relative displacement therebetween. Therefore, when this truck collides against some obstacle or the like and the resultant impact force exceeds a given value, the carrier longitudinally slides over the frame, whereupon a considerable percentage of the kinetic energy, produced by the movement of said carrier, which accounts for about a half of the total deadweight of the truck, and freights loaded thereon, is absorbed by the hydraulic energy absorbing means. As a result, kinetic energy of other parts of the truck than said carrier and freights on it, that is, a cab, said frame and a driver works lineally on the obstacle, thereby reducing kinetic energy working on the frame and energy buffering means, such as bumpers, provided in front and rear of the truck. This reduced kinetic energy can effectively be absorbed by said frame and energy buffering means, resulting in a substantial decrease in negative acceleration G working on the driver, compared with collision of a conventional truck wherein its total deadweight is involved. This is conducive to ensuring the safety of the driver. Also, as previously described, kinetic energy produced by the movement of the carrier and freights thereon over the frame is effectively absorbed by said energy absorbing means, thus reducing impact energy working on the frame. Accordingly, bumpers or other energy buffering means can be made smaller, compared with those of the conventional trucks whose carriers do not move.

BRIEF DESCRIPTION OF THE DRAWINGS

Now several embodiments of this invention will be described in detail with reference to the accompanying drawings, in which.

Like reference numerals denote similar parts throughout the different views of the drawings.

DESCRIPTION OF THE PREFERRED EMBODIMENTS

Figure 1:
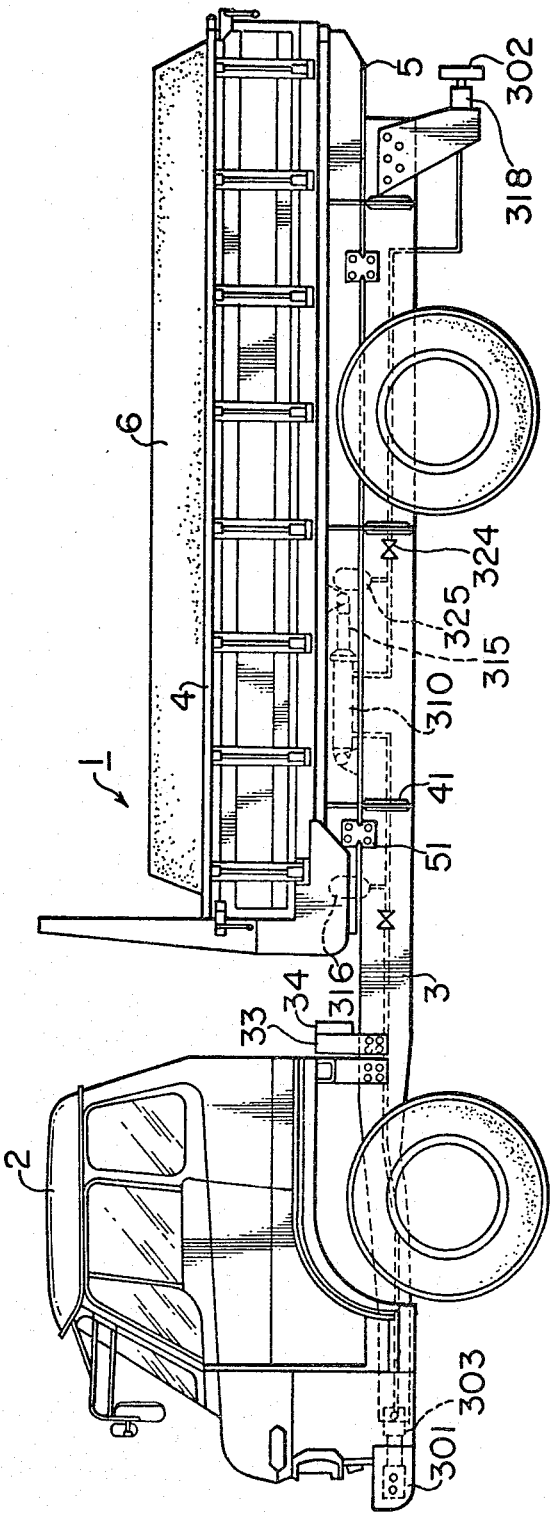
FIG. 1 is a side elevation showing a second embodiment of this invention.
Figure 2:
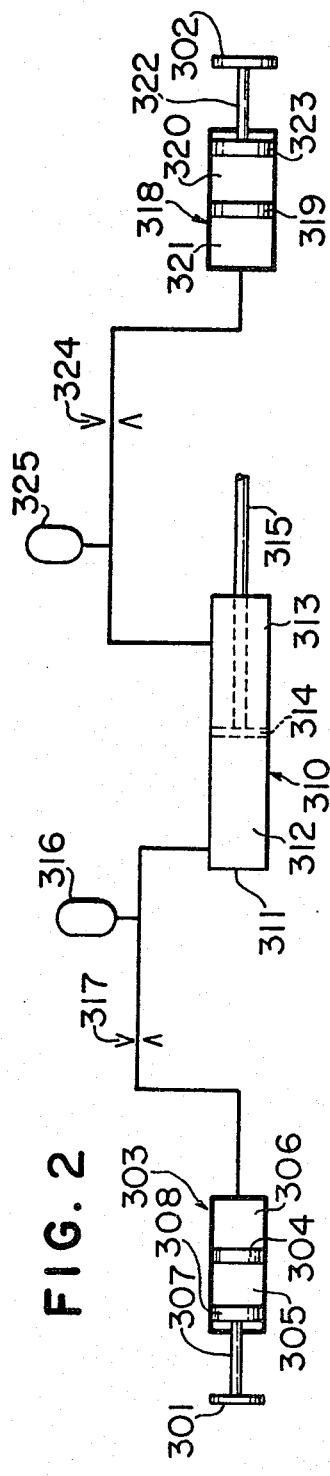
FIG. 2 is a hydraulic pressure system diagram in the principal part of FIG. 1.

In the embodiment of this invention shown in FIGS. 1 and 2, a truck (1) comprises a front bumper (301), a cab (2), a frame (3), a carrier (4) and a rear bumper (302). The front bumper (301) is fitted to the frame (3), with a first hydraulic cylinder (303) therebetween. Said first hydraulic cylinder (303) is divided by a piston (304) fitted therein into a first chamber (305) and a second chamber (306). In said first chamber (305) is fitted a piston (308) connected with a connecting rod (307). Gas is filled therein to act as a pneumatic spring, or a coil spring is interposed between the two pistons (304) and (308). The second chamber (306) is a hydraulic chamber filled with oil. The piston (308) is fixed to said front bumper (301) through the connecting rod (307), and the cylinder (303 is fixed to the frame the cab (2) is firmly mounted on the frame (3). The carrier (4) is fixed to the frame (3) by ordinarily used U-bolts (41) and metal shear plates (51) whose upper and lower portions are bolted to the carrier (4) and the frame (3), respectively, or shear pins which are not shown in the illustrations. The U-bolts (41) restrain the vertical movement of the carrier (4) with respect to the frame (3), while the shear plates (51) or shear pins restrain its longitudinal movement and are broken when a longitudinal impact force exceeding a given value is imposed. A second hydraulic cylinder (310) comprises a cylinder proper (311) placed between the frame (3) and the carrier (4), a first oil chamber (312), a second oil chamber (313), a piston (314) and a connecting rod (315). The cylinder proper (311) is fixed to the frame (3). The first hydraulic chamber (312) communicates with the second chamber (306) of the first hydraulic cylinder (303) through an accumulator (316) and an orifice (317). The piston (314) is fixed to the carrier (4) through the connecting rod (315). The rear bumper (302) is fitted to the frame (3), with a third hydraulic cylinder (318) therebetween. Said third hydraulic cylinder (318) is divided by a piston (319) fitted therein into a first chamber (320) and a second chamber (321). The first chamber (320) is fitted with a piston (323) connected with a connecting rod (322), and either filled with gas to act as a pneumatic spring or provided with a coil spring between the two pistons (319) and (323). The second chamber (321) is a hydraulic chamber filled with oil. The cylinder (318) is fixed to the frame. The piston (323) is connected to the rear bumper (302) through the connecting rod (322). A freight (6) of maximum pay load is loaded on the carrier (4). A friction plate (5) is provided between the carrier (4) and the frame (3).

Composed as described above, when an automobile or other vehicle collides with the front bumper (301) of this truck (1) at a stop, said front bumper (301) is moved to the right in the drawings by the energy of collision, whereupon the piston (308) moves to the right to absorb initial impact force by compressing the gas or coil spring in the first chamber (305). On further rightward movement of the piston (308), the piston (304) sends out the oil in the second chamber (306) into the first oil chamber (312) of the second hydraulic cylinder (310), with part of the kinetic energy worked on said front bumper (301) being absorbed by its fluid resistance at the orifice (317) and the accumulator (316). This transfer of oil pushes the piston (314) to the right, and then the shear plates (51) are cut by a force applied by said piston (314). As a consequence, the carrier (4) slides to the right, and a kinetic energy engendered by the sliding carrier (4) is absorbed by a friction force produced between said carrier (4) and friction plate (5). By the aforesaid movement of the carrier (4), the oil in the second oil chamber (313) is passed to the second chamber (321) of the third hydraulic cylinder (318), through an accumulator (325) and an orifice (324). This oil further pushes the piston (319) to the right, so as to absorb part of the kinetic energy imposed on the front bumper (301) by compressing the gas or coil spring in the first chamber (320).

As may be understood from the above, the kinetic energy imposed on the front bumper (301) when the truck (1) collides with some other vehicle is absorbed by means of the absorption of initial impact force by compressing the gas or coil spring within the first chamber (305) of the first hydraulic cylinder (303), the subsequent conversion, through the action of the piston (314) of the second hydraulic cylinder (310), into the kinetic energy of the sliding carrier (4) that is absorbed by the friction plate (5), and the compression of the gas or coil spring in the first chamber (320) of the third hydraulic cylinder (318). By the combination of these means the impact force of the collision is transmitted to the driver in the cab (2) after being effectively reduced.

Figure 3:
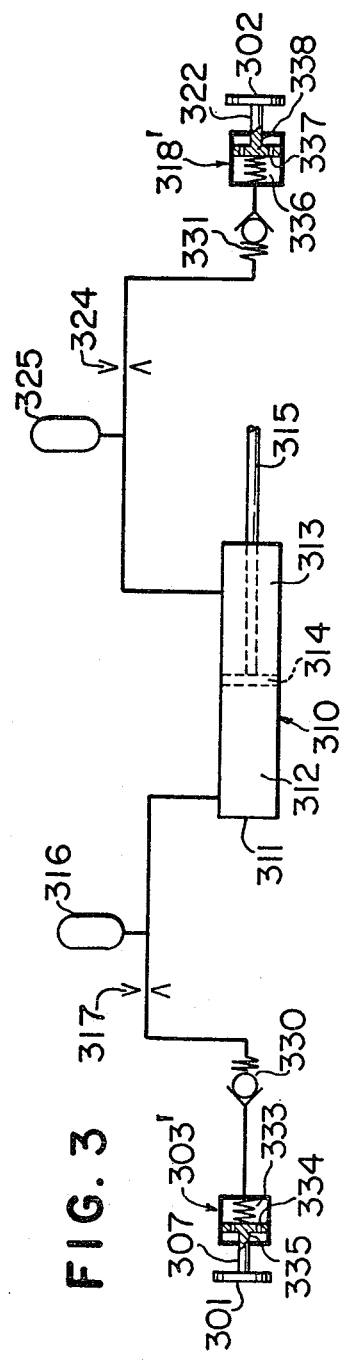
FIG. 3 shows a modified form of FIG. 2.

Instead of said first hydraulic cylinder (303) and third hydraulic cylinder (318) fitted to the front and rear bumpers (301) and (302) respectively, a first hydraulic cylinder (303') and a check valve (330) may be provided on the side of the front bumper (301) and a third hydraulic cylinder (318') and a check valve (331) on that of the rear bumper (302), as illustrated in FIG. 3.

To be more precise, the first hydraulic cylinder (303') has a piston (335), connected with a connecting rod (307) and provided with orifices (334), which is fitted within its oil chamber (333). Similarly, the third hydraulic cylinder (318') has a piston (338), connected with a connecting rod (322) and provided with orifices (337), which is fitted within its oil chamber (336). Therefore, if some other vehicle collides with the front bumper (301), and said front bumper (301) and the piston (335) are pressed toward the right, hydraulic pressure inside the oil chamber (333) becomes higher than a pressure level specified for the check valve (330). Then the piston (335) moves in such a way that part of the impact energy should be absorbed by a resistance that is produced when the hydraulic oil passes through said orifices (334).

In case the truck (1) is collided at its rear bumper (302), its impact energy is absorbed by the reversed action of the mechanism.

I claim:

1. A truck, comprising:
   a truck frame structure,
   a cab for the driver mounted on said frame structure,
   a load carrier structure mounted on said frame structure for frictional sliding movement longitudinally of said frame structure when a longitudinal impact exceeding a predetermined value is imposed on said frame structure,
   a first hydraulic unit connected between said frame structure and said carrier structure and comprising a cylinder extending longitudinally of said structure and a piston slidable in said cylinder and fixed to the other of said structures,
   a first bumper at the front of said frame structure and means mounting said front bumper comprising a second hydraulic unit comprising a cylinder fixed to said frame structure and a piston slidable in said cylinder and fixed to said front bumper,
   a rear bumper at the rear of said frame structure and means mounting said rear bumper comprising a third hydraulic unit comprising a cylinder fixed to said frame structure and a piston slidable in said cylinder and fixed to said rear bumper,
   conduit means connecting the cylinder of said second hydraulic unit with the cylinder of said first hydraulic unit to transmit fluid pressure from said second hydraulic unit to said first hydraulic unit in a direction to move said carrier structure rearwardly of said frame structure in the event of an impact on said front bumper, and
   conduit means connecting the cylinder of said third hydraulic unit with the cylinder of said first hydraulic unit to transmit fluid pressure from said third hydraulic unit in a direction to move said carrier structure forwardly of said frame structure in the event of an impact on said rear bumper.

2. A truck according to claim 1, in which each of said second and third hydraulic units includes between said piston and an end of said cylinder a floating piston dividing the interior of said cylinder into two chambers, spring means in one of said chambers between said floating piston and said piston which is fixed to the respective bumper, and hydraulic fluid in the other of said chambers.

3. A truck according to claim 1, in which each of said conduit means includes an orifice restricting fluid flow.

4. A truck according to claim 1, in which each of said conduit means includes an accumulator.

5. A truck according to claim 1, in which each of said conduit means includes an orifice restricting fuild flow and an accumulator between said orifice and said first hydraulic unit.

6. A truck according to claim 1, in which each of said conduit means includes a check valve permitting flow of fluid in a direction toward said first hydraulic unit.

7. A truck according to claim 1, comprising means for restraining movement of said load carrier structure relative to said frame structure in a vertical direction and shear means normally restraining movement of said load carrier structure longitudinally of said frame structure but shearable in the event of impact exceeding a predetermined value to permit movement of said load carrier structure longitudinally of said frame structure.

* * * * *